R. J. WORKMAN.
COOKING APPARATUS.
APPLICATION FILED JUNE 20, 1912.
1,083,973.
Patented Jan. 13, 1914.
2 SHEETS—SHEET 1.
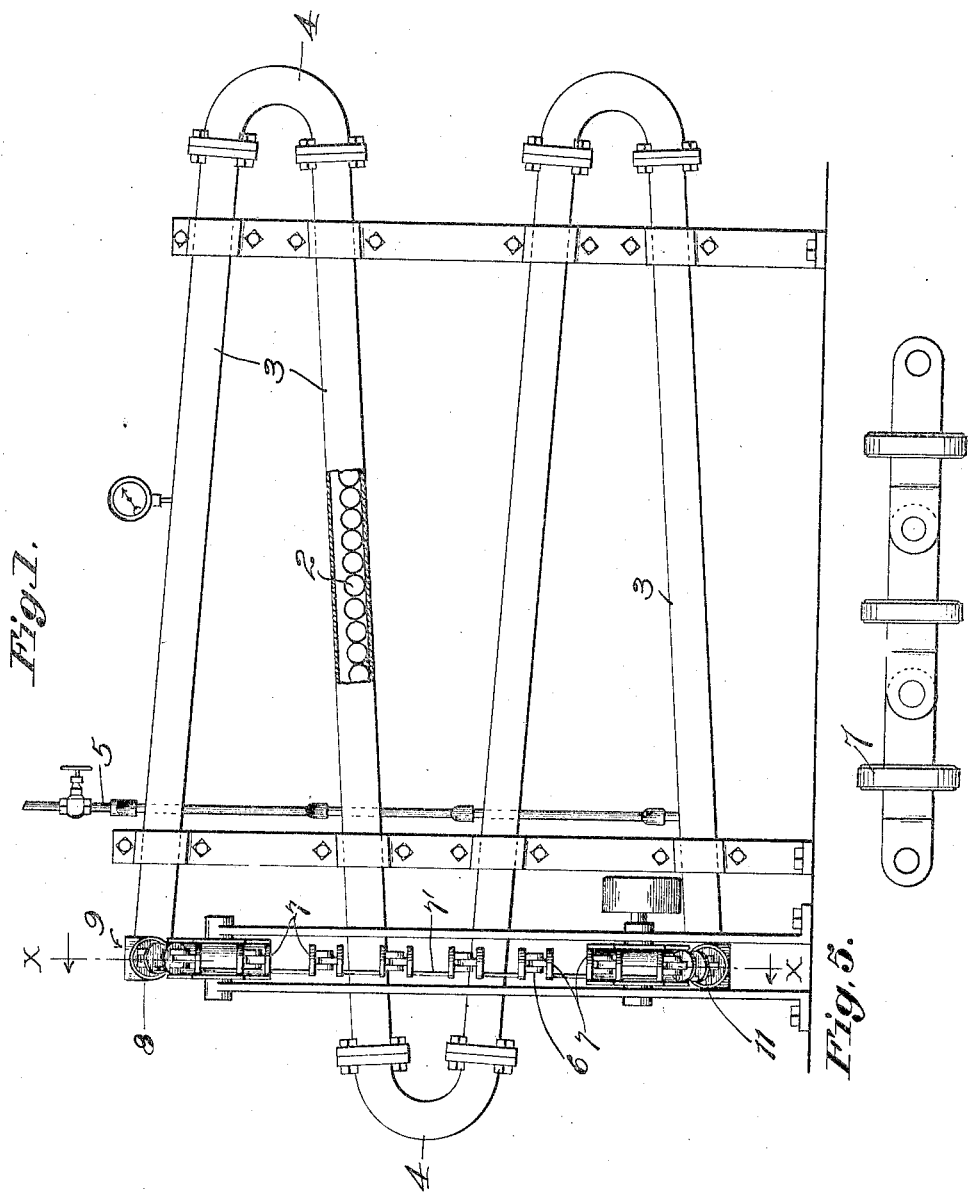
WITNESSES:
Charles Pickles
R. S. Berry
INVENTOR
Robert J. Workman
BY G. H. Strong.
ATTORNEY

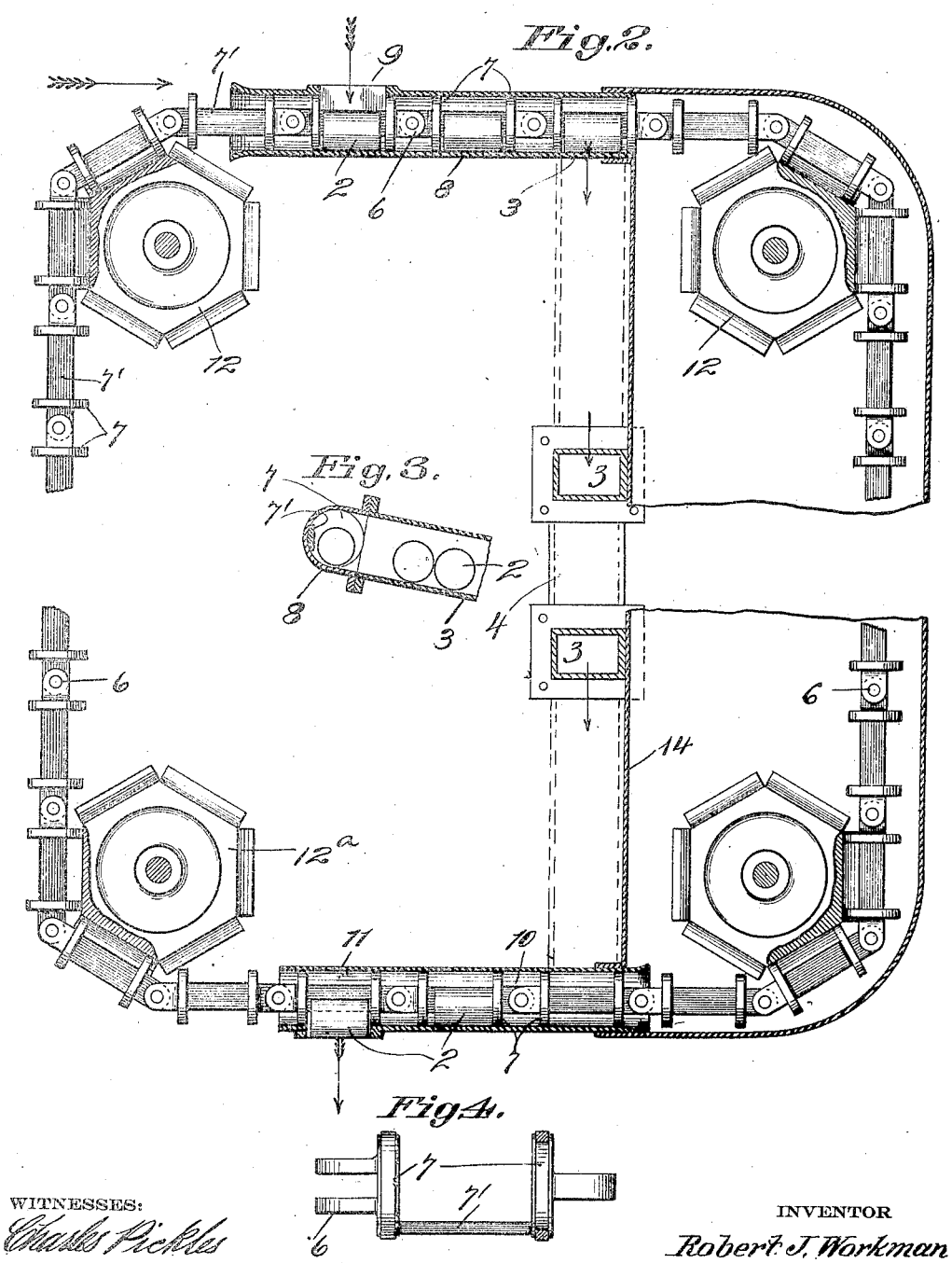

UNITED STATES PATENT OFFICE.

ROBERT J. WORKMAN, OF SAN FRANCISCO, CALIFORNIA.

COOKING APPARATUS.

1,083,973.     Specification of Letters Patent.     Patented Jan. 13, 1914.

Application filed June 20, 1912. Serial No. 704,821.

*To all whom it may concern:*

Be it known that I, ROBERT J. WORKMAN, a citizen of the United States, residing in the city and county of San Francisco and State of California, have invented new and useful Improvements in Cooking Apparatus, of which the following is a specification.

The present invention relates to cooking apparatus and particularly to a continuous cooker for processing canned goods.

It is among the objects of the present invention to provide an apparatus adapted for continuous operation wherever canned goods may be subjected to a cooking process for a desired period of time at the requisite temperature, and particularly to provide a cooking apparatus wherein may be manipulated a multiplicity of cans containings goods, the machine being provided and designed for the purpose of conserving the heating medium, as steam, and also being evolved with the object of occupying as small a floor space and consuming as little power as is possible.

The invention consists of a reservoir or other suitable container for a heated fluid and of means for feeding and receiving cans to and from a cooking or processing chamber.

Figure 1 is a side elevation of the apparatus partly in section. Fig. 2 is an end view of the apparatus partly in section. Fig. 3 is a detail view of the intake end of the cooking chamber. Fig. 4 is an edge view of one of the conveyer links. Fig. 5 shows a modified form of link.

My invention comprehends an apparatus in which cans, as 2, Fig. 1, may be subjected to the necessary processing temperature for the requisite period, and in its illustrated form includes a pressure or heating chamber 3, which I prefer to form in shape as a zigzag vertically arranged continuous flue; the advantage of the zig-zag vertical arrangement being that the cans 2 when admitted to the upper end of the zig-zag chamber will, naturally, gravitate along the inclined courses or stretches and automatically advance to feed from course to course around the curved bends 4 of the flue or chamber, finally discharging at the lowermost end after having been retained in the chamber 3 the requisite length of time, which is determined by the nature of the material being cooked, and after having been subjected to a temperature also determined by the nature of the material.

The substantial flue like chamber 3 may include as many inclined courses as may be desired and each of the courses may be of desired length and thus the capacity of the apparatus may be readily controlled merely by the increase of the length or height of the tortuous chamber 3.

The chamber may be heated by the admission of steam or heated air, or any other medium, and in this instance I have shown a steam pipe connection 5 for admitting steam to the flue chamber 3.

For the purpose of feeding cans containing goods to be cooked to the chamber 3, I have provided an endless carrier conveyer or feeding mechanism illustrated here as consisting of a sprocket chain 6, the links of which may be formed with cylindrical transverse heads 7 forming not only lugs for receiving and carrying cans, but also forming steam tight movable packings or pistons which are guided successively into an intake or transverse tubular extension 8 connecting with the flue. The extension 8 is provided at its upper portion with a can intake 9 from which cans may be delivered into the path of the conveyer 6, the length of the extension 8 being sufficient to allow a plurality of the packing pistons 7 to be at one time encompassed, so that steam or other heating medium in the cooking chamber 3 will be prevented from escaping past the inwardly moving links of the chain, the piston heads acting as movable packings. As a can is carried from the intake 9 and approaches the upper end of the inclined tortuous chamber 3, the can will roll from the open side of the chain link, as shown in Fig. 3, down the incline to the bottom of the cooking chamber.

By means of the conveyer 6 a number of cans can be successively deposited in the cooker, and these will automatically gravitate through the course of the chamber 3, the period of time which each can will occupy being determined according to the desired length of cook to be given. The cans having been exposed in the cooker the desired length of time will be removed therefrom by the same conveyer chain 6 which is formed to travel in a circuitous path and lower course 10 which traverses the lower end of the cooker chamber 3, and the cans from the cooker will enter the pockets between the pistons of the chain and by the movement of the chain be carried transversely from the cooker and discharged from a suitable extension 11 through which the chain traverses.

The upper intake cylinder 9 and the lower exit cylinder 11 are connected with the sealed compartment 14 through which the conveyer 6 passes. By means of this arrangement steam pressure is greatly conserved. The steam which enters between the pistons 7 and the conveyer 6, in the intake cylinder 9, is discharged into the sealed compartment 14. Eventually the pressure in this chamber is substantially the same as the pressure in the cooking apparatus so that as the cans are discharged from the exit cylinder 11 the only loss of steam that takes place is at this point, there being no loss of steam due to the machanism for introducing the cans into the cooker.

In order to provide for the free release of cans from and the infeeding of cans to the conveyer chain, the piston heads 7 of each link are properly spaced and the heads are connected at one side of their diameter by a tie 7', thus leaving the diametrically opposite side of the chain links between the heads 7 entirely open so that the cans, as they enter the upper stretch of the cooking chamber 3, can roll freely from between adjacent link heads 7 and likewise roll as freely into the space between the link heads at the bottom course of the cooker chamber 3.

The conveyer chain is supported and operated by suitably driven sprockets 12ª and idlers 12 which are arranged on opposite sides of the cooker chamber 3 so that there will be an upper stretch of chain from which cans can be fed into the upper portion of the cooker, and a lower stretch, as 10, to receive the cans from the cooker.

The length of time or period of cooking to which the goods in the cans may be subjected may be determined by the speed of travel of the chain which will remove cans from the lower end of the cooking chamber.

From the foregoing it will be seen that I have evolved and provided a cooking apparatus in which I employ a steam or other heating chamber which may be subjected to fluid at the necessary temperature, and that I may successively and successfully introduce and take cans from a cooking chamber without a material percentage of loss of the heating medium in the cooker, which is one of the important advantages of the present invention, it being one of the purposes to so design a cooker that the operation of cooking the material in cans can be continuously performed without the usual loss of time and expenditure of labor in starting and stopping cooking processes for loading and unloading as now ordinarily performed. In my invention the cooking process can be carried on continuously without requiring the opening and closing intermittently for any period of time of the cooking chamber, so that once this has become heated to its maximum efficiency the heat is retained throughout the operation of cooking a batch, and the power required for manipulating the cans is reduced to the minimum.

I avoid loss of steam or other heating medium from the chamber by the employment of a can conveyer which has provisions for packing coöperating elements with which jointure is made by the chain links, the links forming packings to prevent the escape of any material quantity of steam during the loading and unloading of the cooker.

Having thus described my invention what I claim and desire to secure by Letters Patent is—

1. A device of the class described comprising a plurality of inclined tubes arranged in a vertical stack, the ends of said tubes being connected by curved bends to form a continuous passageway, mechanism for introducing cans into the upper end of said passageway and removing said cans from the lower end of said passageway, said mechanism including an upper cylinder connected with the upper end of said passageway, a lower cylinder connected with the lower end of said passageway, a chamber connecting said upper cylinder with said lower cylinder, and a chain carrying pistons adapted to fit the said cylinders, said chain being mounted to enter said upper cylinder, pass through the chamber connecting said cylinders and pass out through the lower cylinder.

2. In a device of the class described in combination, a cooking chamber comprising a continuous tortuous sealed chamber forming a run-way for cans and adapted to retain a hot fluid under pressure, means for introducing cans to said cooking chamber, said means comprising an upper cylinder provided with a side entrance to said cooking chamber, a lower cylinder provided with an opening leading to the exit of said cooking chamber, a sealed compartment connecting said upper cylinder and said lower cylinder, an endless carrier provided with pistons, and sprockets arranged to direct said carrier through the said cylinders and the sealed compartment.

In testimony whereof I have hereunto set my hand in the presence of two subscribing witnesses.

ROBERT J. WORKMAN.

Witnesses:
 JOHN H. HERRING,
 GENEVIEVE S. DONELIN.